(12) United States Patent
Yamada et al.

(10) Patent No.: US 6,464,946 B1
(45) Date of Patent: *Oct. 15, 2002

(54) CATALYTIC CONVERTER FOR CLEANING EXHAUST GAS

(75) Inventors: Koji Yamada; Hirohisa Tanaka, both of Shiga-ken (JP)

(73) Assignee: Daihatsu Motor Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/306,788

(22) Filed: May 7, 1999

(51) Int. Cl.$^7$ .............. B01D 53/88; B01J 8/02; B01J 23/00

(52) U.S. Cl. ............ 422/177; 422/171; 422/180; 502/303; 502/304; 502/339; 502/341

(58) Field of Search ............ 422/171, 177, 422/180; 502/217, 222, 223, 303, 304, 325, 328, 333, 339, 340, 341, 349, 350

(56) References Cited

U.S. PATENT DOCUMENTS

| | | | |
|---|---|---|---|
| 5,130,109 A | * 7/1992 | Wan | 502/304 |
| 5,139,992 A | 8/1992 | Tauster et al. | 502/304 |
| 5,626,826 A | 5/1997 | Chopin et al. | 423/213.2 |
| 5,837,642 A | * 11/1998 | Tanaka et al. | 502/304 |

FOREIGN PATENT DOCUMENTS

| | | | |
|---|---|---|---|
| JP | 62-282641 | 12/1987 | B01J/23/56 |
| JP | 63-77544 | 4/1988 | B01J/23/56 |
| JP | 2-43951 | 2/1990 | B01J/23/56 |
| JP | 3-154635 | 7/1991 | B01J/23/56 |
| JP | 4-284847 | 10/1992 | B01J/23/56 |
| JP | 5-47263 | 7/1993 | B01J/23/56 |
| JP | 6-63403 | 3/1994 | B01J/23/56 |
| WO | WO 92/05861 | 4/1992 | B01D/53/36 |
| WO | WO 97/43035 | 11/1997 | B01D/53/94 |
| WO | WO 98/13139 | 4/1998 | B01J/23/10 |
| WO | WO 98/45027 | 10/1998 | B01D/53/94 |
| WO | WO 98/45212 | 10/1998 | C01G/25/02 |

* cited by examiner

*Primary Examiner*—Hien Tran
(74) *Attorney, Agent, or Firm*—Michael D. Bednarek; Shaw Pittman LLP

(57) ABSTRACT

A catalytic converter for cleaning exhaust gas includes a heat-resistant support which is coated with particles of a zirconium complex oxide of the following formula, $$Zr_{1-(x+y)}Ce_xR_yO_{2-z}$$

where "R" represents at least one element selected from a group consisting of Al and rare earth elements other than Ce, "z" represents the degree of oxygen deficiency determined by the valence and content of the contained Al and/or rare earth element, $0.1 \leq x+y \leq 0.5$, $0.1 \leq x \leq 0.5$, and $0 \leq y \leq 0.2$. A combination of Pt and Rh coexistently carried on the zirconium complex oxide particles. Further, particles of an oxygen-storing complex oxide of a rare earth element are also coated on the support together with the zirconium complex oxide particles.

9 Claims, 1 Drawing Sheet

CATALYTIC CONVERTER FOR CLEANING EXHAUST GAS

BACKGROUND OF THE INVENTION

1. Field of the Invention

The present invention relates to a catalytic converter for effectively cleaning the exhaust gas of an automotive internal combustion engine by removal of nitrogen oxide ($NO_x$), carbon monoxide (CO) and hydrocarbons (HC).

2. Description of the Related Art

As is well known, the exhaust gas of an automotive internal combustion engine inevitably contains harmful substances such as $NO_x$, CO and HC. In recent years, particularly, the restrictions on exhaust gas cleaning are increasingly strict for environmental protection.

A so-called three-way catalytic converter has been most widely used for removing the above-described harmful substances. The three-way catalytic converter utilizes, as an active substance, a precious metal or metals such as Pt, Pd and/or Rh for reducing $NO_x$ to $N_2$ and for oxidizing CO and HC to $CO_2$ and $H_2O$. In this way, the three-way catalytic converter works as a catalyst both for oxidation and reduction.

Various researches have been made to improve the performance of a three-way catalytic converter. One of the three-way catalytic converters which have resulted from such researches utilizes cerium oxide ($CeO_2$) which has an oxygen-storing capacity (OSC); that is, the capacity to occlude gaseous oxygen in the crystalline structure and to release the occluded oxygen from the crystalline structure. More specifically, $CeO_2$ is added to a three-way catalytic converter for adjusting the oxygen concentration of gaseous atmosphere, so that excess oxygen in the gaseous atmosphere is occluded into the crystalline structure of $CeO_2$ in an oxygen-rich state for assisting the catalytic converter in reducing $NO_x$ to $N_2$ while releasing the occluded oxygen into the gaseous atmosphere in a CO- and/or HC-rich state for assisting the catalytic converter in oxidizing CO and HC to $CO_2$ and $H_2O$.

Japanese Patent Publication 5-47263 (which is the granted version of JP-A-63-156545) discloses a catalytic converter for cleaning exhaust gas wherein fine particles of zirconia ($ZrO_2$) carrying a precious metal (e.g. Pt, Rh) are coated on a heat-resistant honeycomb support together with particles of heat-resistant inorganic oxide (e.g. alumina) and particles of an oxygen-storing oxide of a rare earth element. In such a converter, the heat-resistant inorganic oxide and the rare earth element oxide intervene between the agglomerates of the zirconia particles for preventing the zirconia particle agglomerate from growing due to agglomerate-to-agglomerate sintering in high-temperature oxidizing atmosphere, thereby limiting a decrease of specific surface area which may result in degradation of catalytic activity.

While the prior art catalytic converter described above prevents sintering between the zirconia particle agglomerates, it fails to prevent the zirconia particles themselves from growing due to particle-to-particle sintering. Further, depending on its mounting position, the catalytic converter may be subjected to an extremely high temperature which prompts the grain growth of zirconia.

More specifically, there is an increasing demand for shifting the mounting location of the catalytic converter from below the body floor to the exhaust manifold which is near the engine, whereby the catalyst can be quickly warmed up after starting the engine. However, when the catalytic converter is located near the engine, it may be often exposed to a high temperature of no less than 900° C. (or sometimes even higher than 1,000° C.), which may cause grain growth of $ZrO_2$ due to particle-to-particle sintering. As a result, the specific surface area of $ZrO_2$ reduces to result in a decrease of the catalytic activity of the precious metal carried on the zirconia particles.

DISCLOSURE OF THE INVENTION

It is, therefore, an object of the present invention to provide a catalytic converter for cleaning exhaust gas which does not result in an excessive decrease of the catalytic activity of a precious metal or metals even under severe operating conditions above 900° C.

According to the present invention, there is provided a1. A catalytic converter for cleaning exhaust gas comprising: a heat-resistant support; particles of a zirconium complex oxide of the following formula,

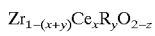

$$Zr_{1-(x+y)}Ce_xR_yO_{2-z}$$

where "R" represents at least one element selected from a group consisting of Al and rare earth elements other than Ce, "z" represents the degree of oxygen deficiency determined by the valence and content of the contained Al and/or rare earth element, $0.1 \leq x+y \leq 0.5$, $0.1 \leq x \leq 0.5$, and $0 \leq y \leq 0.2$; a combination of Pt and Rh coexistently carried on the zirconium complex oxide particles; and particles of an oxygen-storing complex oxide of a rare earth element; wherein the zirconium complex oxide particles are coated on the heat-resistant support together with the oxygen-storing complex oxide particles.

The present invention features that a part of zirconium in zirconia ($ZrO_2$) is substituted with cerium (Ce), and optionally with aluminum (Al) and/or a rare earth element or elements other than cerium. Such substitution restrains the mass transfer of zirconium at high temperature, thereby preventing the zirconia particles from unduly growing. As a result, Pt and Rh coexistently carried on the zirconia particles can retain their catalytic activity above a predetermined level even at high temperature.

Preferably, at least a part of the zirconium complex oxide may be solid solution. This feature is additionally effective for restraining the mass transfer of Zr, thereby enhancing the durability of the catalytic converter at high temperature.

The precious metals Pt and Rh are coexistently carried on the zirconium complex oxide particles for the following reason. If Pt alone is carried on the zirconium complex oxide particles, the particles of Pt exhibit a tendency to grow due to the mass transfer of Pt at high temperature. By contrast, if Rh coexists, it restrains the mass transfer of Pt to prevent grain growth (presumably due to the formation of a rhodium oxide layer on the Pt particles which restrains the mass transfer of Pt).

In the above formula, the relation "$0.1 \leq x+y \leq 0.5$" needs to be met because if the ratio of substitution of zirconium with cerium and other elements is lower or higher than this range, it becomes difficult to effectively prevent the mass transfer of zirconium. If the substitution ratio is higher than this range, Pt and Rh coexistently carried on the zirconium complex oxide may adversely interact with each other to lower the catalytic activity. The same reasons also apply to "$0.1 \leq x \leq 0.5$". Preferably, the value of the "x+y" should lie in the range of 0.2~0.3, whereas the value of the "x" should be set in the range of 0.1~0.28. It should be understood that the content of Zr in the zirconium complex oxide may include 1~3% of hafnium (Hf) which is inevitably contained in Zr ores.

Examples of rare earth elements "R" other than Ce include Y, Sc, La, Pr, Nd, Pm, Sm, Eu, Gd, Tb, Dy, Ho, Er, Tm, Yb and Lu. Of these examples, La and Nd are preferred. The reason for partially substituting Zr of the zirconium complex oxide with the rare earth element other than Ce is that such substitution stabilizes the uniform fluorite structure of the zirconium complex oxide at room temperature while also restraining the mass transfer of Zr in cooperation with Ce.

Alternatively or additionally, a part of Zr in the zirconium complex oxide may be substituted with Al alone or in combination with Y.

The value of the "y" in the above formula is 0~0.2. In this way, the value of the "y" may be 0 so that the zirconium complex oxide does not need to contain Al nor a rare earth element other than Ce because Ce alone partially substituting for Zr of the zirconium complex oxide can restrain the grain growth of the complex oxide particles to some extent. This is why the ranges for the "x+y" and the "x" coincide. However, since the inclusion of Al and/or a rare earth element other than Ce better restrains the growth of the zirconium complex oxide particles, the value of the "y" should be preferably set in the range of 0.02~0.2. The value of the "y" in excess of 0.2 may give rise to side products other than the desired zirconium complex oxide.

The zirconium complex oxide particles may be preferably coated on the heat-resistant support together with the oxygen-storing complex oxide particles and particles of a heat-resistant inorganic oxide. In this case, it is particularly advantageous if the combination of Pt and Rh is selectively carried only on the zirconium complex oxide particles.

Further, the heat-resistant inorganic oxide may be preferably selected from a group consisting of alumina, silica, titania and magnesia all of which are commercially available. Particularly useful is activated alumina.

The oxygen-storing oxide of the rare earth metal may be preferably cerium oxide or a cerium complex oxide. Further, a precious metal such as Pd may be selectively carried only on the particles of the oxygen-storing oxide in addition to the combination of Pt and Rh selectively carried only on the particles of the zirconium complex oxide.

The heat-resistant support, which may be made of cordierite, mullite, α-alumina or a metal (e.g. stainless steel), should preferably have a honeycomb structure. In producing the catalytic converter, 10~200 g of the zirconium complex oxide with a specific surface area of 50~160 $m^2$/g, 30~150 g of the oxygen-storing oxide with a specific surface area of 100~200 $m^2$/g and 0~200 g of the heat-resistant inorganic oxide with a specific surface area of 150~200 $m^2$/g may be coated together, by the known wash-coating method, over the honeycomb support per $dm^3$ (apparent volume) thereof.

The particles of the zirconium complex oxide may preferably have an average grain size of 0.1~2 μm. In a typical example, 0.2~2 g of Pt and 0.04~1 g of Rh may be supported on the particles of the zirconium complex oxide per $dm^3$ (apparent volume) of the honeycomb support.

The zirconium complex oxide according to the present invention may be prepared by using known techniques such as coprecipitation process or alkoxide process.

The coprecipitation process includes the steps of preparing a solution which contains respective salts of zirconium, cerium and optionally Al and/or a rare earth element other than cerium in a predetermined stoichiometric ratio, then adding an aqueous alkaline solution or an organic acid to the salt solution for causing the respective salts to coprecipitate, and thereafter heat-treating the resulting coprecipitate for oxidization to provide a target zirconium complex oxide.

Examples of zirconium salts include zirconium oxychloride, zirconium oxynitrate, zirconium oxysulfate and zirconium oxyacetate. Examples of salts of cerium and other rare earth elements (and/or Al) include sulfates, nitrates, hydrochlorides, phosphates, acetates and oxalates. Examples of aqueous alkaline solutions include an aqueous solution of sodium carbonate, aqueous ammonia and an aqueous solution of ammonium carbonate. Examples of organic acids include oxalic acid and citric acid.

The heat treatment in the coprecipitation process includes a heat-drying step for drying the coprecipitate at about 50~200° C. for about 1~48 hours after filtration, and a baking step for baking the coprecipitate at about 350~1,000° C. (preferably about 400~700° C.) for about 1~12 hours. During the baking step, the baking conditions (the baking temperature and the baking period) should be selected depending on the composition of the zirconium complex oxide so that at least part of the zirconium complex oxide is in the form of solid solution.

The alkoxide process includes the steps of preparing an alkoxide mixture solution which contains zirconium, cerium and optionally Al and/or a rare earth element other than cerium in a predetermined stoichiometric ratio, then adding a deionized water to the alkoxide mixture solution for causing zirconium, cerium and Al (and/or rare earth element other than Ce) to coprecipitate or hydrolyze, and thereafter heat-treating the resulting coprecipitate or hydrolysate to provide a target zirconium complex oxide.

Examples of alkoxides usable for preparing the alkoxide mixture solution include respective methoxides, ethoxides, propoxides and butoxides of zirconium, cerium, and Al (and/or rare earth element other than Ce). Instead, ethylene oxide addition salts of each of these elements are also usable.

The heat treatment in the alkoxide process may be performed in the same way as that in the coprecipitation process.

Pt and Rh may be supported on the zirconium complex oxide by using known techniques. For instance, a solution containing a respective salt (e.g. 1~20 wt %) of Pt and Rh is first prepared, the zirconium complex oxide is then impregnated with the salt-containing solution, and thereafter the zirconium complex oxide is heat-treated. Examples of salts usable for this purpose include nitrate, dinitro diammine nitrate, and chloride. The heat-treatment, which is performed after impregnation and filtration, may include drying the zirconiumcomplex oxide by heating at about 50~200° C. for about 1~48 hours and thereafter baking the complex oxide at about 350~1,000° C. for about 1~12 hours.

Other features and advantages of the present invention will be apparent from the following detailed description of the preferred embodiments given with reference to the accompanying drawings.

BRIEF DESCRIPTION OF THE DRAWINGS

The drawings include a single FIGURE designated as "FIG. 1" which is a graph showing the high-temperature aging conditions which are used for evaluating different catalytic converters in various embodiments of the present invention and in comparative examples.

DETAILED DESCRIPTION OF THE PREFERRED EMBODIMENTS

Figure 1:
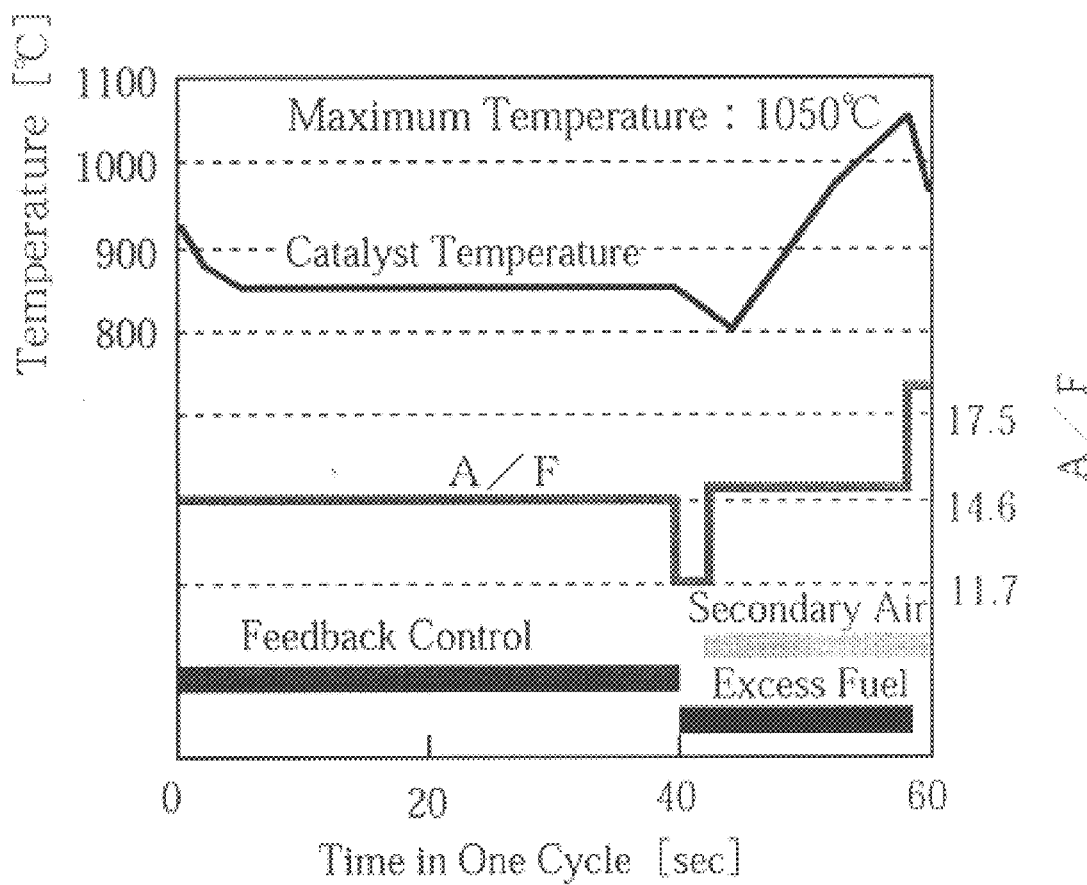

The preferred embodiments of the present invention will be described below together with comparative examples. However, it should be understood that the present invention is not limited to these embodiments. Further, it should be noted that the notation "Oxide" used below represents that the zirconium complex oxide contains a suitable proportion of oxygen which is unilaterally determined by the proportions of the other elements.

Embodiment 1

In this embodiment, a catalytic converter was made using a zirconium complex oxide having the composition of $Zr_{0.80}Ce_{0.16}La_{0.02}Nd_{0.02}$Oxide.
(Preparation of Zirconium Complex Oxide)

The zirconium complex oxide having the above composition was prepared by the so-called coprecipitation process. First, an aqueous mixture solution was prepared by dissolving, in 100 cm$^3$ of deionized water, 0.080 mol of zirconium oxychloride ($ZrOCl_2.8H_2O$), 0.016 mol of cerium nitrate ($Ce(NO_3)_3.6H_2O$), 0.002 mol of lanthanum nitrate ($La(NO_3)_3.6H_2O$) and 0.002 mol of neodymium nitrate ($Nd(NO_3)_3.5H_2O$).

Then, a neutralizing coprecipitation solution was prepared by dissolving 25.0 g of sodium carbonate ($Na_2CO_3$) in 200 cm$^3$ of deionized water, and the mixture solution previously prepared as above was gradually dripped into the resulting coprecipitation solution for causing coprecipitation. After sufficiently washing with water and filtering, the resulting coprecipitate was crushed for 24 hours in a commercially available ball mill with the addition of 100 cm$^3$ of isopropyl alcohol, which resulted in formation of a slurry containing the coprecipitate. The ball mill was made of zirconia ($ZrO_2$ stabilized with 3 mol $Y_2O_3$).

After filtration, the slurry thus obtained was dried at 80° C. under vacuum. Upon sufficient drying, the coprecipitate (which resulted by drying the slurry) was baked in the air at 650° C. for 3 hours to provide powder of zirconium complex oxide having the composition of $Zr_{0.80}Ce_{0.16}La_{0.02}Nd_{0.02}$Oxide wherein Ce, La and Nd were contained as solid solution.

2 kg of the zirconium complex oxide powder obtained by repeating the above steps was supplied with 2 dm$^3$ of isopropyl alcohol and then crushed further for 12 hours in a commercially available attrition mill using zirconia balls of 3 mm in average diameter, isopropyl alcohol being supplemented as required. Then, the slurry containing the additionally crushed powder of the zirconium complex oxide was filtered and dried at 80° C. under vacuum. Upon sufficient drying, the zirconium complex oxide powder was loosened in a mortar and thereafter sieved with a 325-mesh screen. As a result, the portion of the zirconium complex oxide powder which passed through the screen has an average grain size of 1.4 µm (as determined by laser diffraction scattering).
(Fabrication of Catalytic Converter)

50 g of the sieved zirconium complex oxide powder was impregnated with an aqueous solution of dinitro diammine-platinum nitrate (Pt content: 1.5 g) and an aqueous solution of rhodium nitrate (Rh content: 0.3g). The thus impregnated powder was first dried at 110° C. for 12 hours and then baked at 500° C. for 3 hours. As a result, the zirconium complex oxide was made to support or carry 1.5 g of Pt and 0.3 g of Rh.

Then, the Pt- and Rh-supporting zirconium complex oxide was mixed with 130 g of La-stabilized alumina powder (stabilized by La in solid solution) and 75 g of cerium complex oxide powder having the composition of $Ce_{0.6}Zr_{0.3}Y_{0.1}$Oxide in a ball mill and wet-crushed for 12 hours to provide an aqueous mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried at 110° C. for 12 hours and then baked at 500° C. for 3 hours. The target catalytic converter was thus obtained.

Embodiment 2

In this embodiment, again, a catalytic converter was made using a zirconium complex oxide having the composition of $Zr_{0.80}Ce_{0.16}La_{0.02}Nd_{0.02}$Oxide. However, in preparing the zirconium complex oxide, the last two steps of crushing and sieving the zirconium complex oxide powder were omitted, as opposed to Embodiment 1. Otherwise, Embodiment 2 is exactly the same as Embodiment 1.

Embodiment 3

In this embodiment, a catalytic converter was made using a zirconium complex oxide having the composition of $Zr_{0.80}Ce_{0.16}La_{0.04}$Oxide.
(Preparation of Zirconium Complex Oxide)

First, an aqueous mixture solution was prepared by dissolving, in 100 cm$^3$ of deionized water, 0.080 mol of zirconium oxychloride ($ZrOCl_2.8H_2O$), 0.016 mol of cerium nitrate ($Ce(NO_3)_3.6H_2O$), and 0.004 mol of lanthanum nitrate ($La(NO_3)_3.6H_2O$)

Then, a neutralizing coprecipitation solution was prepared by dissolving 25.0 g of sodium carbonate ($Na_2CO_3$) in 200 cm$^3$ of deionized water, and the mixture solution previously prepared as above was gradually dripped into the resulting coprecipitation solution for causing coprecipitation. After sufficiently washing with water and filtering, the resulting coprecipitate was dried at 80° C. under vacuum. Upon sufficient drying, the coprecipitate was baked in the air at 650° C. for 3 hours to provide powder of zirconium complex oxide having the above-mentioned composition wherein Ce and La were contained as solid solution. The average grain size of the zirconium complex oxide powder was 6.1 µm (as determined by laser diffraction scattering).
(Fabrication of Catalytic Converter)

Using 50 g of the thus obtained zirconium complex oxide powder, a catalytic converter was fabricated in the same manner as in Embodiment 1.

Embodiment 4

In this embodiment, a catalytic converter was made using a zirconium complex oxide having the composition of $Zr_{0.70}Ce_{0.16}Al_{0.06}Y_{0.08}$Oxide.
(Preparation of Zirconium Complex Oxide)

Power of zirconium complex oxide having the above-mentioned composition was prepared in the same manner as in Embodiment 3 except that 0.070 mol of zirconium oxychloride ($ZrOCl_2.8H_2O$), 0.016 mol of cerium nitrate ($Ce(NO_3)_3.6H_2O$), 0.006 mol of aluminum nitrate ($Al(NO_3)_3.9H_2O$), and 0.008 mol of yttrium nitrate ($Y(NO_3)_3.6H_2O$) were used as starting materials. The zirconium complex oxide powder had an average grain size of 7.0 µm (as determined by laser diffraction scattering).
(Fabrication of Catalytic Converter)

Using 50 g of the thus obtained zirconium complex oxide powder, a catalytic converter was fabricated in the same manner as in Embodiment 1.

Embodiment 5

In this embodiment, a catalytic converter was made using a zirconium complex oxide having the composition of $Zr_{0.70}Ce_{0.10}Al_{0.20}$Oxide.

(Preparation of Zirconium Complex Oxide)

Power of zirconium complex oxide having the above-mentioned composition was prepared in the same manner as in Embodiment 3 except that 0.070 mol of zirconium oxychloride ($ZrOCl_2.8H_2O$), 0.010 mol of cerium nitrate ($Ce(NO_3)_3.6H_2O$), and 0.020 mol of aluminum nitrate ($Al(NO_3)_3.9H_2O$) were used as starting materials. The zirconium complex oxide powder had an average grain size of 7.3 $\mu$m (as determined by laser diffraction scattering).

(Fabrication of Catalytic Converter)

Using 50 g of the thus obtained zirconium complex oxide powder, a catalytic converter was fabricated in the same manner as in Embodiment 1.

Embodiment 6

In this embodiment, a catalytic converter was made using a zirconium complex oxide having the composition of $Zr_{0.80}Ce_{0.20}$Oxide.

(Preparation of Zirconium Complex Oxide)

Power of zirconium complex oxide having the above-mentioned composition was prepared in the same manner as in Embodiment 3 except that 0.080 mol of zirconium oxychloride ($ZrOCl_2.8H_2O$) and 0.020 mol of cerium nitrate ($Ce(NO_3)_3.6H_2O$) were used as starting materials. The zirconium complex oxide powder had an average grain size of 6.3 $\mu$m (as determined by laser diffraction scattering).

(Fabrication of Catalytic Converter)

Using 50 g of the thus obtained zirconium complex oxide powder, a catalytic converter was fabricated in the same manner as in Embodiment 1.

Embodiment 7

In this embodiment, a catalytic converter was made using a zirconium complex oxide having the composition of $Zr_{0.90}Ce_{0.10}$Oxide.

(Preparation of Zirconium Complex Oxide)

Power of zirconium complex oxide having the above-mentioned composition was prepared in the same manner as in Embodiment 3 except that 0.090 mol of zirconium oxychloride ($ZrOCl_2.8H_2O$) and 0.010 mol of cerium nitrate ($Ce(NO_3)_3.6H_2O$) were used as starting materials. The zirconium complex oxide powder had an average grain size of 7.8 $\mu$m (as determined by laser diffraction scattering).

(Fabrication of Catalytic Converter)

Using 50 g of the thus obtained zirconium complex oxide powder, a catalytic converter was fabricated in the same manner as in Embodiment 1.

Embodiment 8

In this embodiment, use was made of the same zirconium complex oxide powder (Composition:$Zr_{0.80}Ce_{0.16}La_{0.02}Nd_{0.02}$Oxide; Average Grain Size: 5.2 $\mu$m) as used in Embodiment 2 to fabricate a slightly different catalytic converter, as described below.

(Fabrication of Catalytic Converter)

50 g of the zirconium complex oxide powder (Average Grain Size: 5.2 $\mu$m) was impregnated with an aqueous solution of dinitro diammineplatinum nitrate (Pt content: 0.8 g) and an aqueous solution of rhodium nitrate (Rh content: 0.3g). The thus impregnated powder was first dried at 110° C. for 12 hours and then baked at 500° C. for 3 hours. As a result, the zirconium complex oxide was made to support or carry 0.8 g of Pt and 0.3 g of Rh.

On the other hand, 75 g of cerium complex oxide powder having the composition of $Ce_{0.6}Zr_{0.3}Y_{0.}$Oxide was impregnated with an aqueous solution of dinitro diammineplatinum nitrate (Pt content: 0.7 g). The impregnated cerium complex oxide powder was first dried at 110° C. for 12 hours and then baked at 500° C. for 3 hours. As a result, the cerium complex oxide was made to support or carry 0.7 g of Pt.

Then, the two kinds of complex oxide powder was mixed with 130 g of La-stabilized alumina powder (stabilized by La in solid solution) in a ball mill and wet-crushed for 12 hours to provide an aqueous mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried at 110° C. for 12 hours and then baked at 500° C. for 3 hours. The target catalytic converter was thus obtained.

Embodiment 9

This embodiment is the same as Embodiment 7 with respect to the use of a zirconium complex oxide having the composition of $Zr_{0.90}Ce_{0.10}$Oxide but differed therefrom in that the amount of the zirconium complex oxide was increased to 180 g to dispense with alumina powder at the time of coating on the monolithic cordierite honeycomb support.

COMPARATIVE EXAMPLE 1

For comparison, a catalytic converter was made using commercially available zirconia powder having an average grain size of 7.6 $\mu$m (as determined by laser diffraction scattering), instead of using zirconium complex oxide powder according to the present invention.

(Fabrication of Catalytic Converter)

50 g of the zirconia powder was impregnated with an aqueous solution of dinitro diammineplatinum nitrate (Pt content: 1.5 g) and an aqueous solution of rhodium nitrate (Rh content: 0.3g). The impregnated zirconia powder was first dried at 110° C. for 12 hours and then baked at 500° C. for 3 hours. As a result, the zirconia powder was made to support or carry 1.5 g of Pt and 0.3 g of Rh.

Then, the Pt- and Rh-supporting zirconia powder was mixed with 130 g of La-stabilized alumina powder (stabilized by La in solid solution) and 75 g of cerium complex oxide powder having the composition of $Ce_{0.6}Zr_{0.3}Y_{0.1}$Oxide in a ball mill and wet-crushed for 12 hours to provide an aqueous mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried at 110° C. for 12 hours and then baked at 500° C. for 3 hours. The target catalytic converter was thus obtained.

COMPARATIVE EXAMPLE 2

In Comparative Example 2, use was made of the same zirconium complex oxide powder (Composition:$Zr_{0.80}Ce_{0.16}La_{0.02}Nd_{0.02}$Oxide; Average Grain Size: 5.2 $\mu$m) as used in Embodiment 2, but Pt and Rh were supported on the alumina powder instead of the zirconium complex oxide powder, as described below.

(Fabrication of Catalytic Converter)

130 g of commercially available La-stabilized alumina powder (stabilized by La in solid solution) was impregnated with an aqueous solution of dinitro diammineplatinum nitrate (Pt content: 1.5 g) and an aqueous solution of rhodium nitrate (Rh content: 0.3g). The impregnated alumina powder was first dried at 110° C. for 12 hours and then baked at 500° C. for 3 hours. As a result, the alumina powder was made to support or carry 1.5 g of Pt and 0.3 g of Rh.

Then, the Pt- and Rh-supporting alumina powder was mixed with 50 g of the zirconium complex oxide powder (Average Grain Size: 5.2 µm) and 75 g of cerium complex oxide powder having the composition of $Ce_{0.6}Zr_{0.3}Y_{0.1}$Oxide in a ball mill and wet-crushed for 12 hours to provide an aqueous mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried at 110° C. for 12 hours and then baked at 500° C. for 3 hours. The target catalytic converter was thus obtained.

COMPARATIVE EXAMPLE 3

In Comparative Example 3, a catalytic converter was made in the same manner as in Comparative Example 1 except that (1) the amount of the zirconia powder was reduced to 8 g, (2) 75 g of the cerium complex oxide powder was replaced with 40 g of commercially available pure ceria powder ($CeO_2$), (3) the supported amount of Rh was reduced to 0.15 g, and (4) the supported amount of Pt was reduced to 0.75 g.

COMPARATIVE EXAMPLE 4

Comparative Example 4 was the same as Comparative Example 3 with respect to the use of zirconia powder having an average grain size of 7.6 µm but differed therefrom with respect to the coated amount of the zirconia powder and the carrier material on which Pt was supported, as described below.
(Fabrication of Catalytic Converter)

6 g of the zirconia powder was impregnated with an aqueous solution of rhodium nitrate (Rh content: 0.15 g). The impregnated zirconia powder was first dried at 110° C. for 12 hours and then baked at 500° C. for 3 hours. As a result, the zirconia powder was made to support 0.15 g of Rh.

77 g of commercially available La-stabilized alumina powder (stabilized by La in solid solution) was impregnated with an aqueous solution of dinitro diammineplatinum nitrate (Pt content: 0.75 g). The impregnated alumina powder was first dried at 110° C. for 12 hours and then baked at 500° C. for 3 hours. As a result, the alumina powder was made to support 0.75 g of Pt.

Then, the Rh-supporting zirconia powder and the Pt-supporting alumina powder were mixed with 40 g of commercially available pure ceria powder ($CeO_2$) in a ball mill and wet-crushed for 12 hours to provide an aqueous mixture slurry. The mixture slurry was then coated on a monolithic cordierite honeycomb support which had 400 cells/in$^2$ (62 cells/cm$^2$), a diameter of 105.7 mm and a length of 100 mm. The thus coated honeycomb support was dried at 110° C. for 12 hours and then baked at 500° C. for 3 hours. The target catalytic converter was thus obtained.

Performance Evaluation of Catalytic Converters

The respective catalytic converters fabricated according to Embodiments 1~9 and Comparative Examples 1~4 were tested for their performance in cleaning exhaust gas.
(Aging Conditions)

For aging, each of the catalytic converters was mounted on one bank (4 cylinders) of a 4-liter V8-engine which was actually installed on a car, and the engine exhaust gas was introduced into the converter. Specifically, the cycle illustrated in FIG. 1 and continuing for 60 seconds was repeated 3,000 times for a total period of 50 hours.

As shown in FIG. 1, the cycle included a stoichiometric running period (0~40 sec.) wherein the engine is set to run with the feed of stoichiometric air-fuel mixture (A/F=14.6) under feedback control so that the inside temperature of the converter was held at about 850° C. The stoichiometric running period was followed by a fuel-rich period (40~44 sec.) wherein the engine was set to run with the feed of excessive fuel (A/F=11.7) under interruption of the feedback control. The fuel-rich period was then followed by a temperature-rise period (44~56 sec.) wherein the engine continued to run with the feed of excessive fuel under continued interruption of the feedback control but wherein secondary air is introduced from outside the engine into the catalytic converter for reacting the excess fuel with the secondary air within the converter, thereby causing the temperature to rise to a maximum of 1,050° C. The air-fuel mixture supplied to the combination of the engine and the catalytic converter in this temperature-rise period was slightly fuel-lean (A/F=14.8). The temperature-rise period is followed by a lean-running period (56~60 sec.) wherein the feedback control resumes with respect to the engine with the converter held in the fuel-lean state (A/F=18.0) under continued supply of the secondary air.

It should be mentioned here that the temperature within the catalytic converter was detected by a thermocouple inserted in the honeycomb support.
(Method of Evaluation)

After performing the above-described aging, the exhaust gas cleaning performance of each of the catalytic converters was evaluated in the following manner.

The engine was run with an air-fuel mixture which continuously varied from a fuel-rich state to a fuel-lean state, and the resulting exhaust gas was introduced into the catalytic converter for removal of harmful gases such as CO and $NO_x$. The removal ratios for CO and $NO_x$, respectively, were measured to determine the CO—$NO_x$ removal cross point at which the CO-removal ratio coincided with the $NO_x$-removal ratio. The CO—$NO_x$ removal cross point thus determined was used for performance evaluation of the catalytic converter.

In this performance evaluation test, the engine was used without stalling on a car, and the temperature of the exhaust gas introduced into the catalytic converter was 450° C. Further, the air-fuel mixture was supplied to the engine at a space velocity of 90,000/h with an A/F fluctuation of ±1.0.
(Results of Evaluation)

Table 1 shows the CO—$NO_x$ removal cross point thus determined for each of the catalytic converters. In Table 1, the following abbreviations are used.

C.P.: Cross Point
Emb.: Embodiment
C.E.: Comparative Example
ZCLN: $Zr_{0.80}Ce_{0.16}La_{0.02}Nd_{0.02}$Oxide
ZCL: $Zr_{0.80}Ce_{0.16}La_{0.04}$Oxide
ZCAY: $Zr_{0.70}Ce_{0.16}Al_{0.06}Y_{0.08}$Oxide
ZCA: $Zr_{0.70}Ce_{0.10}Al_{0.20}$Oxide
Z8C: $Zr_{0.80}Ce_{0.20}$Oxide
Z9C: $Zr_{0.90}Ce_{0.10}$Oxide
CZY: $Ce_{0.6}Zr_{0.3}Y_{0.1}$Oxide

TABLE 1

| Sample No. | Catalyst Composition | | CO—$NO_x$ C.P. |
|---|---|---|---|
| Emb. 1 | [Rh(0.3) + Pt(1.5)]/ZCLN(50)* | $Al_2O_3$(130) CZY(75) | 93 |
| Emb. 2 | [Rh(0.3) + Pt(1.5)]/ZCLN(50) | $Al_2O_3$(130) CZY(75) | 91 |

TABLE 1-continued

| Sample No. | Catalyst Composition | | | CO—NO$_x$ C.P. |
|---|---|---|---|---|
| Emb. 3 | [Rh(0.3) + Pt(1.5)]/ZCL(50) | Al$_2$O$_3$(130) | CZY(75) | 91 |
| Emb. 4 | [Rh(0.3) + Pt(1.5)]/ZCAY(50) | Al$_2$O$_3$(130) | CZY(75) | 89 |
| Emb. 5 | [Rh(0.3) + Pt(1.5)]/ZCA(50) | Al$_2$O$_3$(130) | CZY(75) | 88 |
| Emb. 6 | [Rh(0.3) + Pt(1.5)]/Z8C(50) | Al$_2$O$_3$(130) | CZY(75) | 89 |
| Emb. 7 | [Rh(0.3) + Pt(1.5)]/Z9C(50) | Al$_2$O$_3$(130) | CZY(75) | 86 |
| Emb. 8 | [Rh(0.3) + Pt(0.8)]/ZCLN(50) | Al$_2$O$_3$(130) | Pt(0.7)/CZY(75) | 90 |
| Emb. 9 | [Rh(0.3) + Pt(0.8)]/Z9C(180) | | CZY(75) | 85 |
| C.E. 1 | [Rh(0.3) + Pt(1.5)]/ZrO$_2$(50) | Al$_2$O$_3$(130) | CZY(75) | 76 |
| C.E. 2 | ZCLN(50) | [Rh(0.3) + Pt(1.5)]/Al$_2$O$_3$(130) | CZY(75) | 82 |
| C.E. 3 | [Rh(0.15) + Pt(0.75)]/ZrO$_2$(8) | Al$_2$O$_3$(130) | CZY(75) | 67 |
| C.E. 4 | Rh(1.5)/ZrO$_2$(6) | Pt(0.75)/Al$_2$O$_3$(130) | CZY(75) | 65 |

Note:
(1) The star mark (*) indicates that the average grain size of the powder is no more than 2 μm.
(2) The number in the parenthesis represents weight.
(3) The slash mark (/) indicates that Pt and/or Rh are supported on the relevant substance.

Conclusion

As appreciated from Table 1, the zirconium complex oxide in any one of Embodiments 1~9 exhibits a higher CO—NO$_x$ removal cross point (as determined after the high-temperature aging) than those in Comparative Examples 1~4. This means that the zirconium complex oxide of the present invention can effectively restrain grain growth at high temperature while the selective coexistence of Pt and Rh on the particles of the zirconium complex oxide prevents grain growth of Pt at high temperature.

Further, comparison of Example 1 (where the average grain size of the zirconium complex oxide powder was no more than 2 μm) with Example 2 (where the average grain size was higher than 2 μm) reveals that the exhaust gas cleaning performance enhances with a decrease of the average grain size of the zirconium complex oxide powder. Moreover, Embodiments 2~6 indicate that substitution of Zr with Al and/or a rare earth element (e.g. La, Y, Nd) in solid solution also provides an enhancement of the exhaust gas cleaning performance.

In conclusion, therefore, a catalytic converter according to the present invention may be advantageously incorporated in an intake manifold to provide a good catalytic activity even at high temperature.

What is claimed is:

1. A catalytic converter for cleaning exhaust gas comprising:

a heat-resistant support;

particles of a zirconium complex oxide of the following formula,

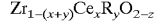

$$Zr_{1-(x+y)}Ce_xR_yO_{2-z}$$

where "R" represents at least one element selected from a group consisting of Al and rare earth elements other than Ce, "z" represents the degree of oxygen deficiency determined by the valence and content of the contained Al and/or rare earth element, $0.1 \leq x+y \leq 0.5$, $0.1 \leq x \leq 0.5$, and $0 \leq y \leq 0.2$;

a combination of Pt and Rh coexistently and selectively carried directly only on the zirconium complex oxide particles; and particles of an oxygen-storing oxide of a rare earth element;

wherein the zirconium complex oxide particles are coated on the heat-resistant support together with the oxygen-storing oxide particles.

2. The catalytic converter according to claim 1, wherein the zirconium complex oxide particles are coated on the heat-resistant support together with the oxygen-storing oxide particles and particles of a heat-resistant inorganic oxide.

3. The catalytic converter according to claim 1, wherein the zirconium complex oxide meets the relations $0.2 \leq x+y \leq 0.3$, $0.1 \leq x \leq 0.28$, and $0.02 \leq y \leq 0.2$ in said formula.

4. The catalytic converter according to claim 1, wherein R in said formula is either La alone, Al alone, a combination of La and Nd, or a combination of Al and Y.

5. The catalytic converter according to claim 1, wherein at least part of the zirconium complex oxide is solid solution.

6. The catalytic converter according to claim 1, wherein the particles of the zirconium complex oxide have an average grain size of 0.1~2 μm.

7. The catalytic converter according to claim 1, wherein the oxygen-storing oxide of the rare earth element is cerium oxide or a cerium complex oxide.

8. The catalytic converter according to claim 2, wherein the heat-resistant inorganic oxide is selected from a group consisting of alumina, silica, titania and magnesia.

9. The catalytic converter according to claim 1, wherein the heat-resistant support has a honeycomb structure.

* * * * *